United States Patent
Lee

(10) Patent No.: US 8,462,182 B2
(45) Date of Patent: Jun. 11, 2013

(54) TERMINAL AND METHOD FOR DISPLAYING AN IMAGE

(75) Inventor: Eun Young Lee, Seoul (KR)

(73) Assignee: LG Electronics Inc., Seoul (KR)

(*) Notice: Subject to any disclaimer, the term of this patent is extended or adjusted under 35 U.S.C. 154(b) by 1513 days.

(21) Appl. No.: 11/777,808

(22) Filed: Jul. 13, 2007

(65) Prior Publication Data

US 2008/0272986 A1    Nov. 6, 2008

(30) Foreign Application Priority Data

May 4, 2007    (KR) .................. 10-2007-0043762

(51) Int. Cl.
*G09G 3/20*    (2006.01)

(52) U.S. Cl.
USPC ........... 345/698; 345/629; 345/634; 345/587; 715/778

(58) Field of Classification Search
USPC ........... 345/587, 800, 629, 634, 698; 715/778
See application file for complete search history.

(56) References Cited

U.S. PATENT DOCUMENTS

| | | | |
|---|---|---|---|
| 6,307,549 B1 | 10/2001 | King et al. | |
| 6,967,663 B1 | 11/2005 | Bastos et al. | |
| 2003/0001899 A1* | 1/2003 | Partanen et al. | 345/800 |
| 2005/0170309 A1 | 8/2005 | Raby et al. | |
| 2006/0168537 A1* | 7/2006 | Hochmuth et al. | 715/778 |
| 2007/0002072 A1* | 1/2007 | Frensch et al. | 345/587 |
| 2007/0018887 A1 | 1/2007 | Feyereisen et al. | |

FOREIGN PATENT DOCUMENTS

| | | |
|---|---|---|
| CN | 1489751 | 4/2004 |
| CN | 1584713 | 2/2005 |
| EP | 0 538 057 A2 | 4/1993 |
| EP | 0 952 546 A2 | 10/1999 |
| EP | 1 729 256 A1 | 12/2006 |

\* cited by examiner

*Primary Examiner* — Amare Mengistu
*Assistant Examiner* — Joseph G Rodriguez
(74) *Attorney, Agent, or Firm* — Lee, Hong, Degerman, Kang & Waimey

(57) ABSTRACT

In order to enhance image quality, a terminal, when displaying an image on a QVGA display with a resolution greater than the image itself, renders one of every 5 to 7 pixel rows and one of every 5 to 7 pixel columns semi-transparent. The semi-transparent pixel rows and columns are displayed with opacity of between 10% and 40% of the original pixels. For example, an image having a resolution of 176×144 pixels is displayed at 320×240 pixels on a QVGA display will have one of every 5 to 7 pixel rows and columns semi-transparent.

16 Claims, 7 Drawing Sheets

(5a-1)

(5a-2)

(5b-1)

(5b-2)

TERMINAL AND METHOD FOR DISPLAYING AN IMAGE

CROSS REFERENCE TO RELATED APPLICATION

This application claims the benefit of the Korean Patent Application No. 10-2007-0043762, filed on May 4, 2007, which is hereby incorporated by reference as if fully set forth herein.

FIELD OF THE INVENTION

The present invention relates to a method for displaying an image, and more particularly, to a terminal and method of displaying an image. Although the present invention is suitable for a wide scope of applications, it is particularly suitable for enhancing image quality for displaying images such as a still picture or a VIDEO on the terminal.

DISCUSSION OF THE RELATED ART

Generally, remarkable developments of the information communication technologies bring rapid transitions of information and communication equipment. Mobile terminals are regarded as a necessity in modern society and in order to meet users' demands, mobile communication terminals have not only voice communication capabilities, but also the capabilities to reproduce and display multimedia content such as a video and multimedia broadcast.

Reproducing and displaying multimedia content is as important as voice communication. Terminal users tend to use the terminal for multimedia reproduction, including mobile broadcast reception, rather than voice communication.

As the technological communication developments accelerate, terminals capable of video communication enabling two-way visual communication are gradually being introduced.

However, terminals having two-way visual communication may have image resolution less than that of a terminal display, and when the image is displayed as a full screen image on a screen having a resolution greater than that of the image. In such a case, the image may be viewed as a mosaic.

SUMMARY OF THE INVENTION

Accordingly, the present invention is directed to a terminal and method for displaying an image that substantially obviate one or more problems due to limitations and disadvantages of the related art.

An object of the present invention is to provide a terminal and method for displaying an image in which the image quality is enhanced when the image having a lower resolution is displayed on a display at a higher resolution.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described, a method of displaying an image according to an embodiment the present invention includes processing an image wherein selected rows and columns of the image are rendered semi-transparent and displaying the processed image having a first resolution and displaying the image at a second resolution. The second resolution is greater than the first resolution. The processing of the displayed image includes rendering at least one row of every first number of pixel rows and at least one column of pixels of every second number of pixel columns semi-transparent.

In another aspect of the present invention, a mobile terminal comprises a display unit configured to display an image and a control unit configured to process the image and to display the image on the display unit in which selected rows and columns of the displayed image are rendered semi-transparent. The displayed image has a first resolution and the display unit has a second resolution, and wherein the second resolution is greater than the first resolution. The control unit processes the displayed image to render at least one row of every first number of pixel rows and at least one column of pixels of every second number of pixel columns semi-transparent.

In yet another aspect of the present invention, a mobile terminal comprises a display unit configured to display an image and a control unit configured to display the image in a first size, to enlarge the image and display the enlarged image in a second size on the display unit, the second size being larger than the first size, and to process the enlarged image wherein selected rows and columns of the enlarged image are rendered semi-transparent. The image has a first resolution, and the display unit has a second resolution greater than the first resolution, and the enlarged image is displayed at the second resolution. The control unit processes the enlarged image to render at least one row of every first number of pixel rows and at least one column of pixels of every second number of pixel columns semi-transparent. The opacity of the semi-transparent row and column pixels is in the range of 10% to 40% of the original pixels It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Embodiments of the present invention are applicable to any kind of a terminal capable of displaying images such as a laptop, a desktop, a TV, as well as a mobile terminal. In the following description, a mobile terminal performs video communication such as a video telephony. The scope of the present invention is not restricted to the description and embodiments.

Figure 1:
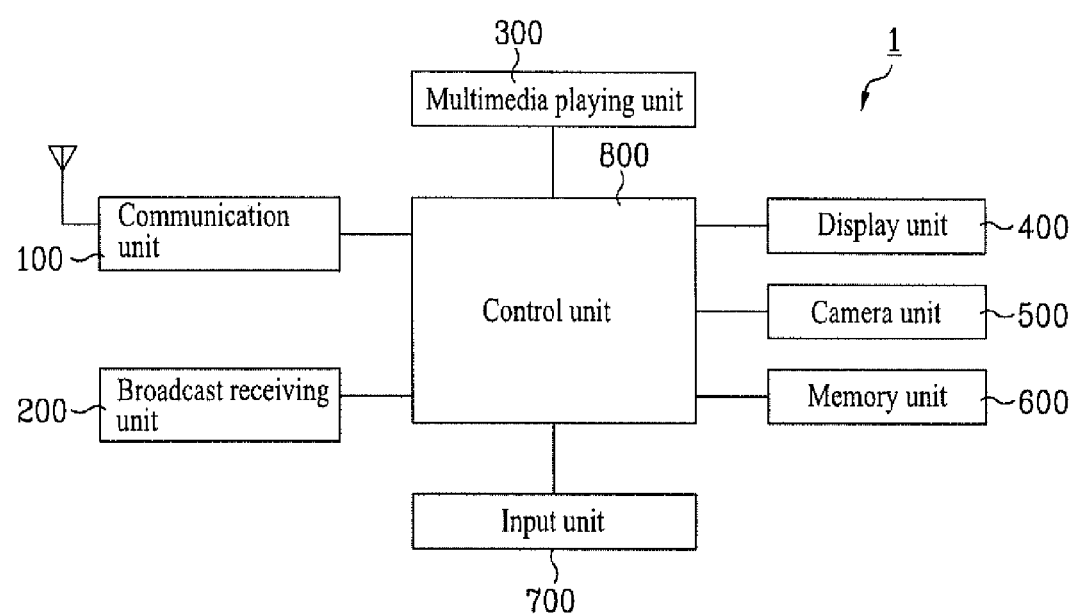
FIG. 1 is a schematic block diagram of a mobile terminal according to an embodiment of the present invention.

A configuration of a mobile terminal according to an embodiment of the present invention is explained with reference to FIG. 1 as follows. Referring to FIG. 1, a mobile terminal 1 includes a communication unit 100, a broadcast receiving unit 200, a multimedia playing unit 300, a display unit 400, a camera unit 500, a memory unit 600, an input unit 700, and a control unit 800.

The mobile terminal may include various additional elements (e.g., a battery unit, etc.). Since the additional elements are not directly associated with the present invention, explanations for these elements are omitted in the following description for clarity.

In implementing the elements of the present invention, two or more elements may be combined to configure one element, or one element can be divided into at least two elements.

The respective elements of the mobile terminal 1 are explained in detail. The communication unit 100 enables the mobile terminal 1 to perform wireless communication with another terminal or other devices over a mobile communication network. In particular, while a terminal user performs voice communication with another terminal, the communication unit 100 may also receive images from the other terminal or transmit images captured by the camera unit 500 to the other terminal. If video communication is not necessary for the mobile terminal 1, the communication unit 100 and the camera unit 500 may be omitted from the mobile terminal 1.

The broadcast receiving unit 200 receives various kinds of broadcasts such as MediaFlo (media forward link only) in the U.S.A., DMB (digital multimedia broadcasting) in Korea, DVB-H (digital video broadcasting-handheld) in Europe, and may further include terrestrial DTV and satellite TV. If a broadcast receiving function is unnecessary for the mobile terminal 1, the broadcast receiving unit 200 may be omitted from the mobile terminal 1.

The multimedia playing unit 300 reproduces various multimedia contents stored in the memory unit 600. The multimedia contents may include video files, still picture files, and audio files. If a multimedia playing function is unnecessary for the mobile terminal 1, the multimedia playing unit 300 may be omitted from the mobile terminal 1.

The display unit 400 provides an operational display of the functions of the mobile terminal 1, and also displays multimedia content according to the various functions of the mobile terminal 1. If the display unit 400 includes a touchscreen, the display unit 400 acts as an input unit 700 for receiving various commands or information from the terminal user. In particular, the display unit 400 is able to display video communication, a broadcast image, a multimedia reproduction, or an image produced by the camera unit 500.

The camera unit 500 provides images or videos for storing in the memory unit 600 or for transmitting to another terminal. The camera unit 500 may be omitted from the mobile terminal 1, if desired.

The memory unit 600 stores software and data for providing the functions provided by the mobile terminal 1. The memory unit 600 also stores multimedia files reproduced using the multimedia playing unit 300.

The input unit 700 (e.g., a keypad) enables the terminal user to provide information or commands to the terminal 1. If the display unit 400 includes a touchscreen, the input unit 700 may be omitted.

The control unit 800 controls the communication unit 100, the broadcast receiving unit 200, the multimedia playing unit 300, the display unit 400, the camera unit 500, the memory unit 600, and the input unit 700.

Various embodiments of the present invention are explained with reference to FIG. 2 and FIGS. 3A to 3C as follows.

Figure 2:
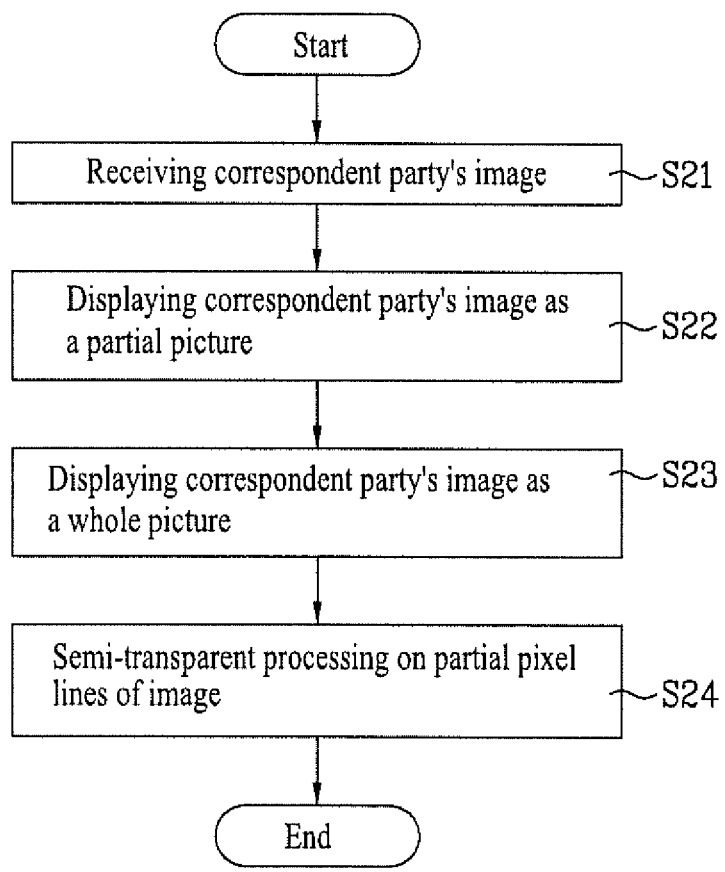
FIG. 2 is a method of displaying an image according to one embodiment of the present invention.
Figure 3A:
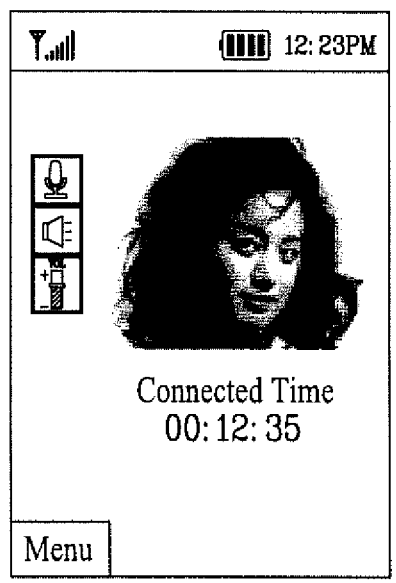
FIGS. 3A to 3C are views of a terminal screen implementing a method for displaying an image according to one embodiment of the present invention.
Figure 3B:
Figure 3C:
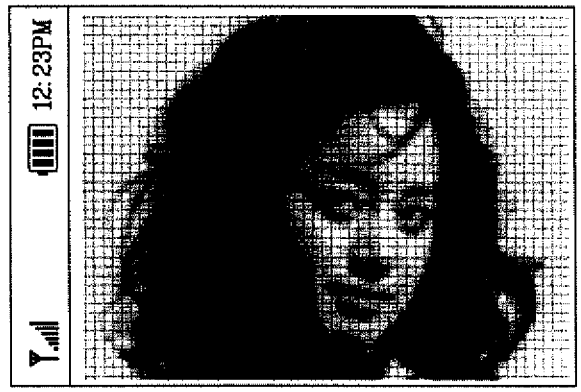

FIG. 2 shows a method of displaying an image according to one embodiment of the present invention, and FIGS. 3A to 3C are views of a display unit screen of a mobile terminal according to the present invention.

Displaying an image received in the course of video communication is an example used for describing embodiments of the present invention, such embodiments are therefore not only applicable to video communication but also to a broadcast images, a multimedia contents reproduction, and displaying a camera image.

For the purposes of this example, the resolution of an image is 176×144 (i.e., the image is constructed as an array of 176×144 pixels) and the resolution of the display unit is Quarter Video Graphics Array (QVGA) having a resolution of 320×240 pixels. The present invention is not restricted to these values but is applicable to circumstances in which the resolution of an image is less than the resolution of the display.

Referring now to FIG. 2, the mobile terminal receives an image from another terminal (S21). If the received image is displayed on the display unit using a resolution of 176×144 pixels or lower (e.g., if the received image is displayed as a partial image having a size equal to or smaller than a size of the display unit), the received image is displayed normally (S22) as shown in FIG. 3A.

If the received image is displayed on the display unit using more than 176×144 pixels (e.g., if the received image is displayed as a full screen image), the received image is displayed as mosaic (S23) as shown in FIG. 3B. This phenomenon takes place because resolution of the received image is less than the resolution of the display unit 400.

If the displayed image is processed to make selected pixel lines of the image semi-transparent, the image quality can be enhanced (S24) as shown in FIG. 3C.

Figure 4:
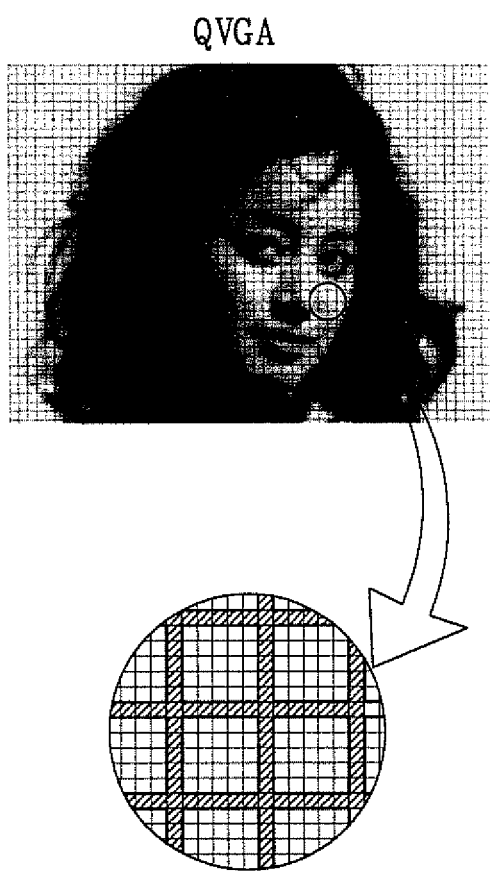
FIG. 4 is a view of an image displayed on a QVGA quality display unit to one embodiment of the present invention.

The semi-transparent image processing is explained in detail with reference to FIG. 4 as follows. FIG. 4 shows an image displayed on a QVGA quality display unit according to an embodiment of the present invention. In the following description, the received image is displayed as a full screen image shown in FIG. 4.

Referring to FIG. 4, semi-transparent processing is performed on selected pixel lines within the displayed image. The pixel lines within the image can be divided into pixel rows of horizontal lines and pixel columns of vertical lines. The image is processed by selecting at least one of the pixel rows from every prescribed number of pixel rows and then making the selected row or rows semi-transparent. Preferably, one of every five to seven pixel rows becomes semi-transparent. More preferably, about one of every six pixel rows of the image becomes semi-transparent.

In particular, when the display unit is a QVGA display, one of every five to seven pixel rows of the image preferably is processed to be semi-transparent. More preferably, one of every six pixel rows of the image is processed to be semi-transparent as shown in FIG. 4.

The pixel columns of the image are processed in a like manner in which one of every five to seven, preferably one of every six, pixel columns is processed to be semitransparent.

In particular, with a QVGA quality display unit, one of every five to seven pixel columns of the image is preferably processed to be semi-transparent. More preferably, one of every six pixel columns of the image, as shown in FIG. 4, is preferably processed to be semi-transparent.

The pixel rows and columns do not require processing at the same rate, but are processed to be semi-transparent within the same range. Preferably, the pixel rows and columns are processed semi-transparent at the same rate.

In processing the pixel lines to be semi-transparent according to an embodiment of the present invention, the pixel lines may be adjusted to be completely opaque, that is a uniform monochrome of gray or black. Viewers have found the quality of an image having semi-transparent pixel lines superior to an image having completely opaque pixel lines. In particular, pixel lines with the semi-transparent opacity in the range of 10% to 40% are preferred. In this case, 10% opacity means the brightness of the pixel lines is 10% darker than the original brightness of the underlying pixels. In some cases, the preferable opacity of the semi-transparent pixels is about 20% for optimal image quality. Measuring the effects of image processing may be accomplished by observing the actual experiences of viewers rather than quantitative calculations.

Figure 5A:
FIG. 5A and FIG. 5B are views showing an enhancement to image quality by rendering pixel lines of an image semi-transparent according to one embodiment of the present invention.
Figure 5A:
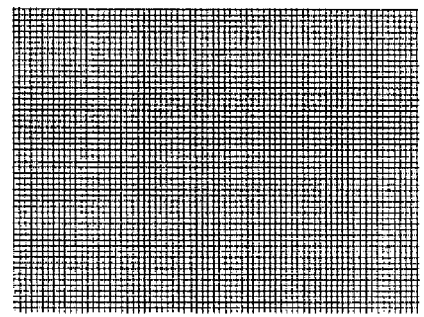
Figure 5B:
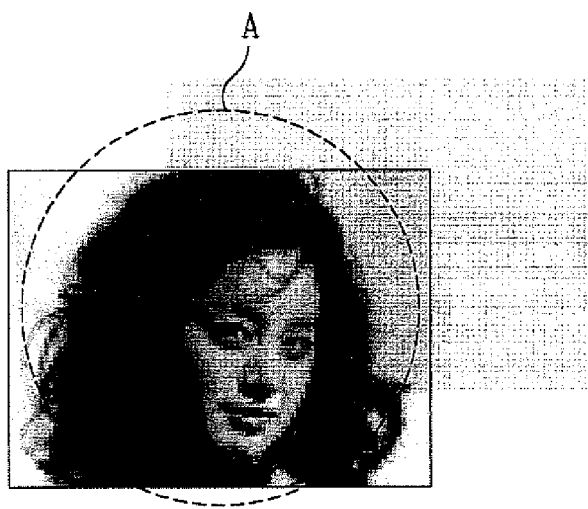
Figure 5B:
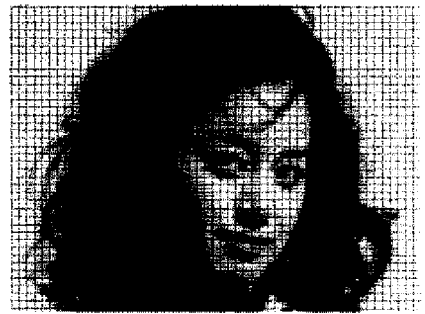

Image quality enhancement by adding selected semi-transparent pixel lines to the displayed image is explained in detail with reference to FIG. 5A and FIG. 5B. FIG. 5A and FIG. 5B are diagrams depicting an image quality enhancement by performing semi-transparent processing on selected pixel lines of an image according to an embodiment of the present invention.

FIG. 5A or FIG. 5B shows a simulation in which the selected pixel lines are processed by overlapping the image with a semi-transparent grid. In the actual implementation of the present invention, the grid is generated by software.

An image 5*a*-1 to be displayed and a semi-transparent grid 5*a*-2 to perform processing on selected pixel lines of the image, as shown in FIG. 5A, are prepared. The grid partially overlaps the image as shown in 5*b*-1. This image quality of the partially overlapped portion can be seen in 5*b*-1, and the fully overlapped image in 5*b*-2.

In the foregoing example, when an image is displayed as a full screen image on a QVGA quality display unit of a mobile terminal, semi-transparent processing has been performed on pixel lines of the image for image quality enhancement. This condition is equally applicable to other display resolutions such as VGA (Video Graphics Array), SVGA (Super VGA), XGA (eXtended Graphics Array), SXGA (Super XGA), UXGA (Ultra XGA).

Figure 6:
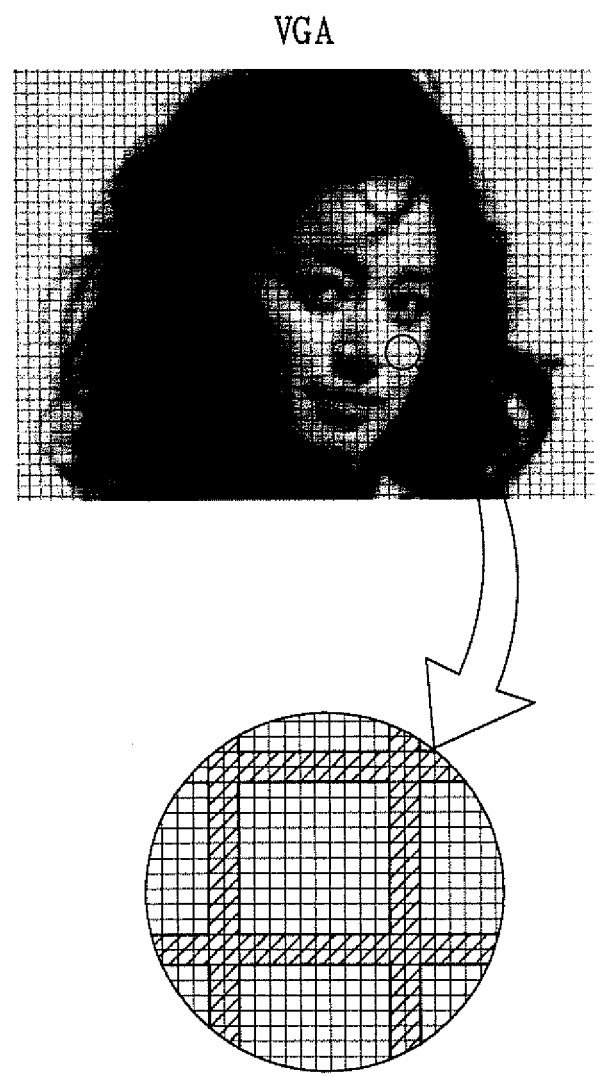
FIG. 6 is a view of an image displayed on a VGA quality display unit according to one embodiment of the present invention.

In the following example, displaying an image as a full screen image on a VGA resolution display having a resolution of 640×480 pixels according to an embodiment of the present invention is explained with reference to FIG. 6.

In the displayed image, it is preferable that one fifth to one seventh, and more preferably one sixth, of the pixel rows are regularly processed to be semi-transparent. The processing is the same as explained previously. In particular, in case of the VGA quality display unit, two of every 10 to 14, and more preferably two of every 12, pixel rows of the image are processed to be semi-transparent. In addition, one fifth to one seventh of the pixel columns of the image regularly are processed semi-transparent. More preferably, about one sixth of the pixel columns of the image regularly are processed semi-transparent. The processing is the same as explained in the preceding example.

As in the previous example, the pixel rows and columns need not be processed to be semi-transparent by the same rate but are just processed to be semi-transparent within the range. Preferably, the pixel rows and columns are processed to be semi-transparent by the same rate.

Accordingly, this example improves the image quality when an image having relatively low resolution is displayed as a large-scale image on a display unit. Selected pixel lines of the image are processed to be semi-transparent thereby improving the image quality to a viewer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display unit configured to have a first resolution and to display an image of a second resolution, which is less than the first resolution, at a resolution that is greater than the second resolution or equal to the first resolution such that the image is displayed in a scale that is larger than an original scale of the image; and
a control unit configured to:
process the image to be displayed on the display unit, by selecting at least one row of pixels from a first number of pixel rows and at least one column of pixels from a second number of pixel columns to be rendered as semi-transparent; and
control the display unit to display the processed image comprising the semi-transparent at least one row of pixels and at least one column of pixels such that first brightness of the selected at least one row of pixels and at least one column of pixels is darker than second brightness of unselected pixel rows and columns on the displayed image, the semi-transparent at least one row of pixels and at least one column of pixels constituting a grid that overlaps with the displayed image,
wherein a distance between each of the semi-transparent at least one row of pixels and a distance between each of the semi-transparent at least one column of pixels in the grid are constant, and
wherein a number of the selected at least one row of pixels is less than the first number of pixel rows and a number of the selected at least one column of pixels is less than the second number of pixel columns.

2. The terminal of claim 1, wherein the second resolution is 176×144 pixels.

3. The terminal of claim 2, wherein the display unit has one of a Quarter Video Graphics Array (QVGA), Video Graphics Array (VGA), Super VGA (SVGA), eXtended Graphics Array (XGA), Super XGA, (SXGA), or Ultra XGA (Ultra XGA) resolution.

4. The terminal of claim 3, wherein the first number of pixel rows and the second number of pixel columns are between 5 and 7 when the processed image is displayed on the display unit having the QVGA resolution, and wherein the first number of pixel rows and the second number of pixel columns are between 10 and 14 when the processed image is displayed on the display unit having the VGA resolution.

5. The terminal of claim 1, wherein the control unit renders one-fourth to one-sixth of the first number of pixel rows semi-transparent and renders one-fourth to one-sixth of the second number of pixel columns semi-transparent.

6. The terminal of claim 1, wherein the opacity of the at least one selected row of pixels and the at least one selected column of pixels is between 10% to 40%.

7. The terminal of claim 1, wherein the image is a video telephony image.

8. The terminal of claim 1, wherein the control unit is further configured to enlarge the image before identifying the at least one row of pixels and at least one column of pixels to define as semi-transparent regions.

9. The terminal of claim 8, wherein the display unit displays the processed image at the first resolution.

10. A method for displaying an image in a mobile terminal, the method comprising:

processing the image of a first resolution to be displayed on a display unit of the mobile terminal having a second resolution, which is greater than the first resolution, by selecting at least one row of pixels from a first number of pixel rows and at least one column of pixels from a second number of pixel columns to be rendered as semi-transparent; and displaying the processed image comprising the semi-transparent at least one row of pixels and at least one column of pixels at a resolution that is greater than the first resolution or equal to the second resolution such that the image is displayed in a scale that is larger than an original scale of the image, and first brightness of the selected at least one row of pixels and at least one column of pixels is darker than second brightness of unselected pixel rows and columns on the displayed image, wherein the semi-transparent at least one row of pixels and at least one column of pixels constitute a grid that overlaps with the displayed image, wherein a distance between each of the semi-transparent at least one row of pixels and a distance between each of the semi-transparent at least one column of pixels in the grid are constant, and wherein a number of the selected at least one row of pixels is less than the first number of pixel rows and a number of the selected at least one column of pixels is less than the second number of pixel columns.

11. The method of claim 10, wherein the first resolution is 176×144 pixels.

12. The method of claim 11, wherein the display unit has one of a Quarter Video Graphics Array (QVGA), Video Graphics Array (VGA), Super VGA (SVGA), eXtended Graphics Array (XGA), Super XGA, (SXGA), or a Ultra XGA (Ultra XGA) resolution.

13. The method of claim 12, wherein the first number of pixel rows and the second number of pixel columns are between 5 and 7 when the processed image is displayed on the display unit having the QVGA resolution, and wherein the first number of pixel rows and the second number of pixel columns are between 10 and 14 when the processed image is displayed on the display unit having the VGA resolution.

14. The method of claim 10, wherein the opacity of the selected at least one row and the selected at least one column is between 10% to 40%.

15. The method of claim 10, wherein processing renders one fourth to one-sixth of the first number of pixel rows semi-transparent and renders one fourth to one-sixth of the second number of pixel columns semi-transparent.

16. The method of claim 10, wherein the image is a video telephony image.

* * * * *